United States Patent
Conway

[11] Patent Number: 5,873,600
[45] Date of Patent: Feb. 23, 1999

[54] MODULAR LIGHT GENERATING AND EMITTING ROLLER SKATE WHEEL

[76] Inventor: Pervis Conway, 3214 S. State St., Lockport, Ill. 60441

[21] Appl. No.: 643,972

[22] Filed: May 7, 1996

Related U.S. Application Data

[63] Continuation-in-part of Ser. No. 543,278, Oct. 16, 1995, Pat. No. 5,580,093.

[51] Int. Cl.$^6$ ..................................................... A63C 17/26
[52] U.S. Cl. ........................... 280/816; 301/5.3; 362/78; 362/192
[58] Field of Search .................................... 280/809, 811, 280/816, 11.22; 301/5.3, 5.7; 362/72, 78, 103, 192; 310/67 R, 67 A, 73, 154, 264

[56] References Cited

U.S. PATENT DOCUMENTS

| | | | |
|---|---|---|---|
| 1,333,119 | 3/1920 | Krag-Moller | 362/192 X |
| 2,622,931 | 12/1952 | Petrelli et al. | 301/5.7 |
| 2,633,387 | 3/1953 | Cooke et al. | 301/5.7 |
| 4,114,952 | 9/1978 | Kimmell | 301/5.7 |
| 4,191,988 | 3/1980 | Kumakura | 362/72 |
| 4,298,910 | 11/1981 | Price | 280/809 X |
| 4,363,502 | 12/1982 | Bakerman | 280/816 |
| 4,782,431 | 11/1988 | Park | 362/192 X |
| 5,271,633 | 12/1993 | Hill, Jr. | 301/5.7 X |
| 5,294,188 | 3/1994 | Vancil, Jr. | 362/78 X |
| 5,390,941 | 2/1995 | Pozzobon et al. | 280/811 X |
| 5,475,572 | 12/1995 | Tseng | 362/78 |
| 5,552,972 | 9/1996 | Rezvani | 280/11.22 X |
| 5,592,030 | 1/1997 | Adahan | 307/80 |

*Primary Examiner*—J. J. Swann
*Assistant Examiner*—Michael Mar
*Attorney, Agent, or Firm*—Hill & Simpson

[57] ABSTRACT

The present invention includes a modular component skate wheel particularly usable in connection with preferably an in-line skate boot. All of the components are interchangeable and the components in preferred embodiments include snap fit surfaces. Preferably, a three piece wheel with interchangeable tire, hub and stationary drum is included to allow the user to adapt the modular skate wheels to the intended purpose. The tires may contain at least one light source for purposes of illuminating the preferably clear, transparent (or translucent) tires. The removable inner hub may be adaptable to contain a two-bearing configuration similar to existing skate wheels for the lightweight skating and maneuverability, such as required for roller hockey or speed skating. A generator may be snapped into the inner hub and used as a means of power to illuminate a light source contained within the tire or located on the boot if a flashy appearance is desired. This arrangement permits the user to mix and match components, so as to customize the modular skate wheel.

26 Claims, 5 Drawing Sheets

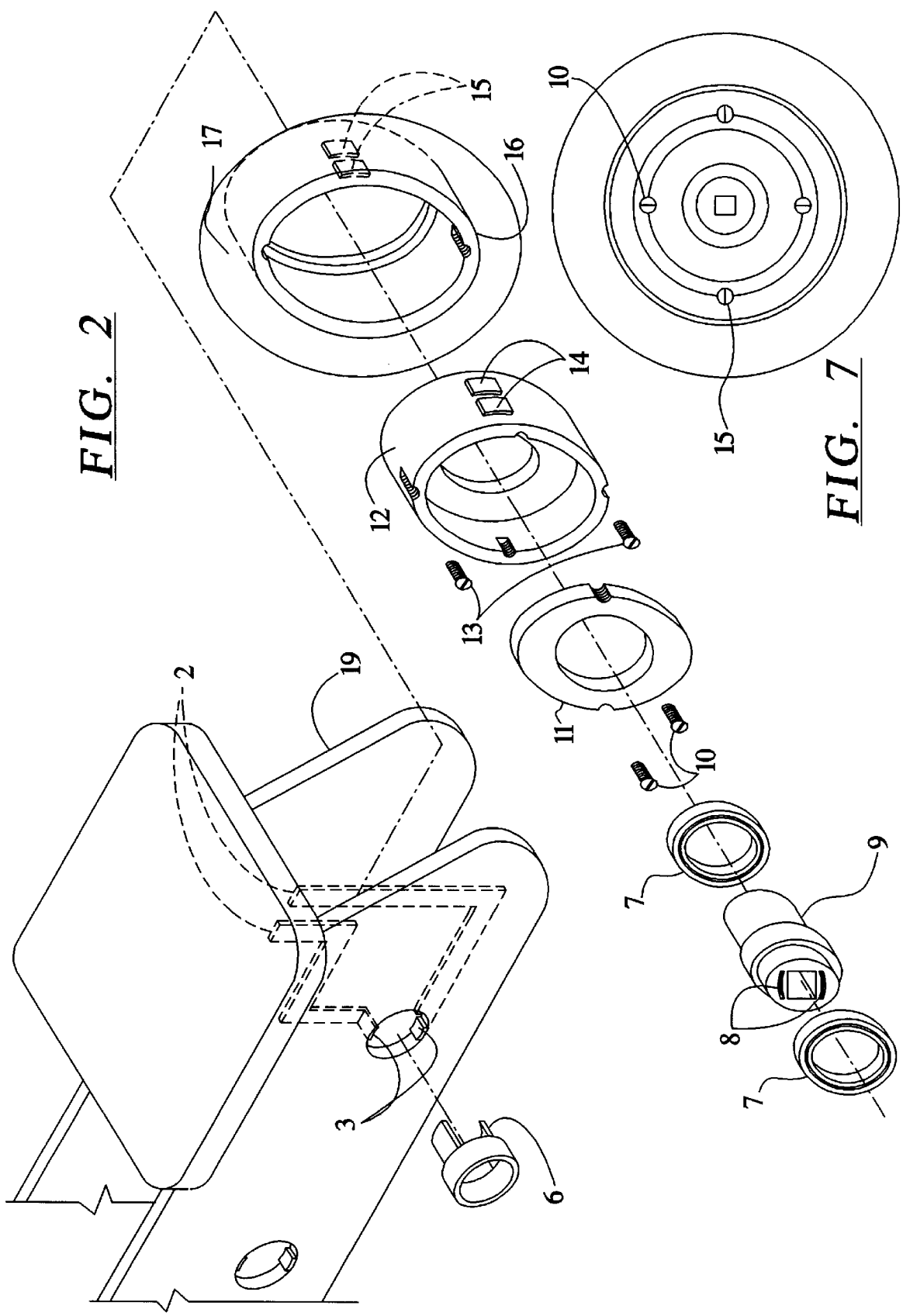

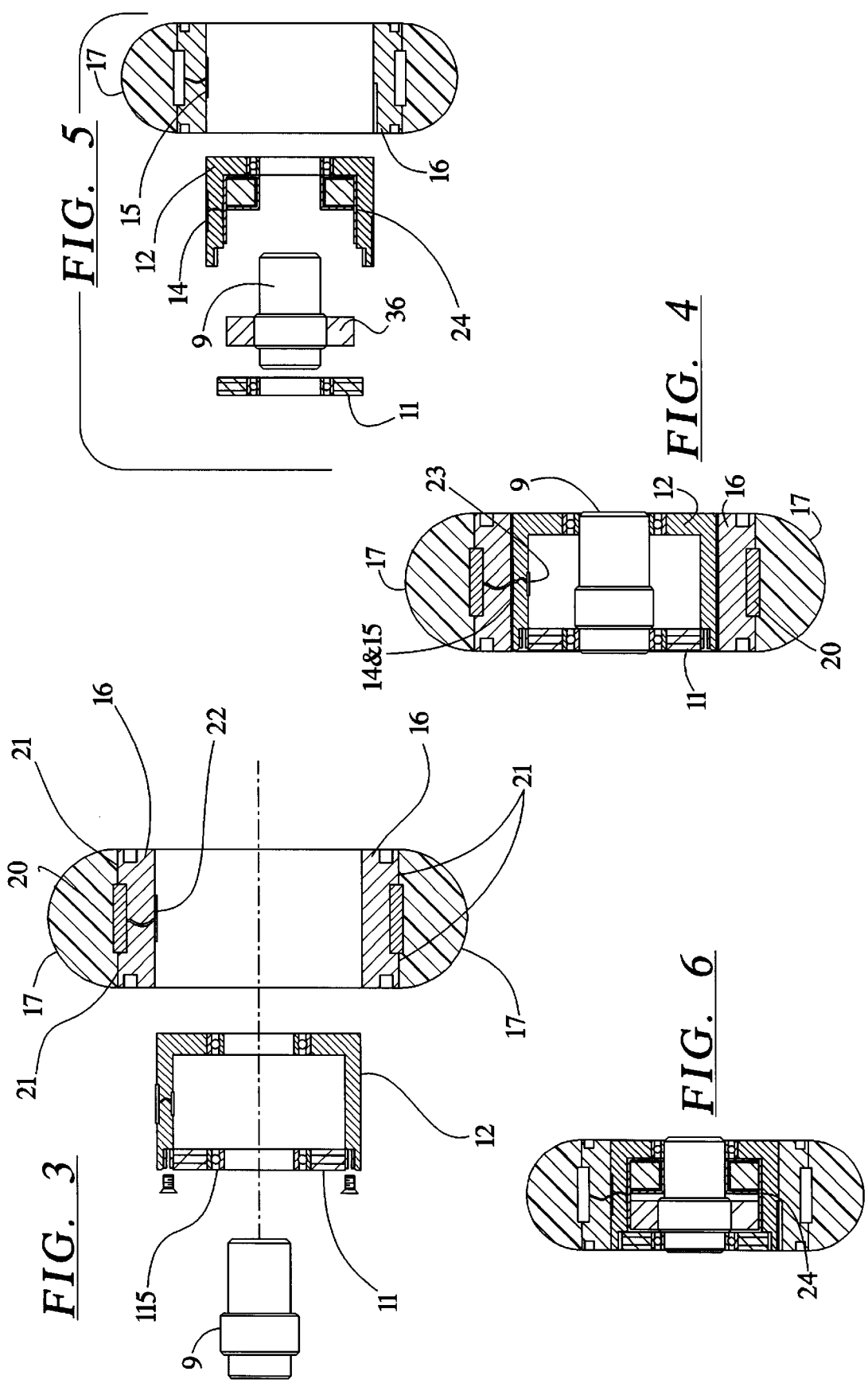

MODULAR LIGHT GENERATING AND EMITTING ROLLER SKATE WHEEL

This is a continuation-in-part of Ser. No. 08/543,278, filed on Oct. 16, 1995, now U.S. Pat. No. 5,580,093.

BACKGROUND OF THE INVENTION

The present invention relates in general to in-line skates, and more particularly to an improved modular light generating and emitting in-line skate wheel for use upon an in-line skate.

In all known embodiments there is provision for a single unit roller skate wheel. For example, see U.S. Pat. No. 4,298,910 to Price, U.S. Pat. No. 5,294,188 to Vancil, U.S. Pat. No. 5,475,572 to Tseng, and U.S. Pat. No. 4,363,502 to Bakerman. Generally, these wheels appear to have been assembled at the point of manufacture, and then marketed as a single unit. So far as is presently known, there are no multiple component skate wheels which can be easily assembled or disassembled by the user. Improvements are necessary and desirable to permit user-friendly interchangeability or replacement of components. Specifically, the ability to replace a worn tire without replacing the entire wheel would be cost effective. Designer colored tires could be mixed or matched by the user for his enjoyment. If the wheel contains a generator hub, it may be easily replaced if damaged. For racing, the wheel may be made lighter if the generator is removed and the original hub is used in its place.

It is known from the prior art that alternating current generators and direct current generators exist and that alternating current generators have been incorporated in the design of roller skate wheels. See U.S. Pat. No. 4,298,910 to Price. The physical exertion of a skating enthusiast is used to produce rotational energy in the skate wheel, which powers a means of electrical generation to power a light or sound producing device. So far as is presently known, direct current generators have not been adapted for use with in-line skate wheels. Because modern technology has allowed miniaturization of electrical components, it is possible to convert an alternating current generator to a direct current generator within a confined space. As the inventor hereof has discovered, it would be desirable to have the armature of the direct current generator, including the electrical components which make it a direct current generator, contained within an interchangeable hub of a three component in-line skate wheel that the user could easily assemble.

Improvements to existing devices are necessary to allow for the use of a direct current generator contained within the interchangeable hub of an in-line skate wheel. In addition to the armature, the hub would contain either a bridge rectifier, an in-line diode or a capacitor. The beneficial and non-obvious effects of these combinations include the facts that the addition of any of these components will convert an alternating current generator to a direct current generator. Also, the addition of an in-line diode will permit electron flow in one direction only, thereby producing intermittent flow of direct current. The bridge rectifier will allow electron flow in one direction only producing continuous flow of direct current. The capacitor will allow electron flow in one direction, discharge when it reaches capacity and produce a relatively large intermittent flow of direct current. It has been discovered that these effects are desirable for in-line skate wheels because electric power can then be transmitted to the illumination means in various forms or pulses which permit production of interesting visible light variations to the observer. This invention in-line diode combination will produce an intermittent visible light, the bridge rectifier combination will produce a continuous light, and a capacitor combination will produce a relatively bright slow pulsing light. Because the current invention allows for interchangeable wheel parts, an in-line skate enthusiast may use any combination of parts to produce a unique personalized lighting effect.

It has been known from the prior art that roller skate wheels may contain an alternating current generation means. (See U.S. Pat. No. 4,298,910 to Price) or a direct current battery (See U.S. Pat. No. 5,294,188 to Vancil, U.S. Pat. No. 5,475,572 to Tseng, and U.S. Pat. No. 4,363,502 to Bakerman) to illuminate light emitting diodes for a stroboscopic effect. It is also known from the prior art to illuminate roller skate wheels on the outboard side of the wheel (See U.S. Pat. No. 5,294,188 to Vancil, U.S. Pat. No. 5,475,572 to Tseng, and U.S. Pat. No. 4,363,502 to Bakerman). Improvements on the roller skate wheel design have been shown to be necessary to accommodate the restrictions imposed by the wheel supports of in-line skates. In particular, illuminating a wheel on the outboard side is practical for traditional roller skates because there are no outboard side barriers to restrict the visibility of the emitted light. However, in-line skates are constructed with outboard supports which would obstruct the visibility. What seemed practical for roller skates is not practical for in-line skates. In-line skate wheels are arranged in a straight line and are anchored both inboard and outboard within the skate framework. Thus, it has been discovered that using a transparent or translucent illuminated tire would allow light to be seen 360° around the skate.

From the prior art it is also known that generators contained within a roller skate wheel produce alternating current to power light emitting diodes (See U.S. Pat. No. 4,298,910 to Price). The light produced is flashing or stroboscopic in effect. So far as the inventor is aware, generators which produce direct current have not been used to produce unusual and desirable light patterns in an in-line skate wheel. Improvements are warranted to permit various illumination patterns for lighted in-line skate wheel. Since in-line skate wheels are supported on both sides by the skate framework, it would be desirable to illuminate that portion of the tire which is visible to an observer. A direct current generator contained within the hub of the in-line skate wheel in conjunction with a single light source would produce interesting patterns of light. For instance, a direct current generator with an eight pole magnet produces four stationary points of light, one in each of the quadrants of the tire. At least two quadrants are visible around the skate wheel framework at all times. Concurrently, other stationary light patterns are visible in direct proportion to the number of poles on the generator magnet or magnets. In addition, light projected through the transparent or translucent tire is visible directly ahead and behind the skater. This is not the case with wheels described in previous art. If a reflective strip is added to the inner diameter of the tire, the emitted light is reflected and intensified within the transparent or translucent tire. The light becomes more evenly distributed and makes the whole tire glow. Because the whole tire glows, more light becomes visible to the observer.

It is further known from prior art that generators have been affixed to bicycle wheels to illuminate identification lamps, (See U.S. Pat. No. 4,191,988 to Kumakura) or hand held lamps, (See U.S. Pat. No. 1,333,119 to Krag-Moller). It is also known that the wheels of roller skates can be illuminated by means of an internal generator and light source, (See U.S. Pat. No. 4,298,910 to Price. So far as the inventor is aware, there is no means to convey power from a generator in a skate wheel to the skate boot for purposes of producing sound or illuminating a company logo or other decoration. Improvements are necessary to permit the transfer of energy from the generating wheel to the skate boot. Illuminating a company logo or other design would be desirable and fashionable. For instance, tee shirts, umbrellas and other paraphernalia with company logos are currently in vogue.

SUMMARY OF THE INVENTION

With these considerations in mind, the principal consideration for inventively solving prior art problems and difficulties is that the present invention proposes a unique three piece component in-line skate wheel. All of the components are interchangeable, and the components will readily snap fit together. The inventive, three piece wheel with interchangeable tire, hub and stationary drum will allow the in-line skate enthusiast to reasonably adapt the skates to his intended purpose. This improved arrangement permits the user to mix and match components so as to customize the in-line skate wheel to his satisfaction or use.

The improved wheel of the present invention has interchangeable transparent or translucent tires which are preferably available in colors. Tire colors can be mixed or matched by the user without having to replace the entire wheel assembly. If a tire wears out, it may be replaced without the expense of replacing the entire wheel. The present invention keeps the mechanical hub intact as the tire is replaced. The tires may contain at least one light source for purposes of illuminating the clear, transparent or translucent colored tires. The removable inner hub can contain a two bearing configuration similar to existing skate wheels for the lightweight skating and maneuverability required for roller hockey or speed skating. A generator may be snapped into the inner hub and used as a means of power to illuminate a light source contained within the tire or located on the boot if a flashy appearance is desired. A younger skater may wish to start with the basic package of components and upgrade components at a later date. For instance, a non-generating hub may be used with colored tires. Since there are four wheels on each in-line skate, or potential for eight power generation sources, many combinations for powering illuminated tires or decoration on the boot are possible.

The present invention also takes and combines the three-piece in-line skate wheel with a power source (for example, friction, generators, dissimilar metals, batteries, solar etc.) and in some preferred embodiments a direct current generator. The direct current generator, as opposed to an alternating current generator, provides power to the boot or to one or more light sources contained within the tire.

Previously, hub mounted induction coils have been demonstrated by Price, Park and Kumakura. All of these coils have been mounted on a circumference larger than that of the magnet because the space was available. One difference between prior art and the current envision is that the coil of the current invention is mounted "side-by-side" in relation to the magnet. This design permits a more compact arrangement of the wheel components necessary for in-line skating. For example, Krag-Moller teaches the use of armatures disposed along opposite sides of the coil, as does the current invention which consists of two components with molded arms which are fit together. One component of the armature also contains a center spindle on which the coil is wound. The design of the armature provides a means of encapsulation for the coil. One distinct difference between the current invention and Krag-Moller is that the arms are formed in such a manner as to extend laterally from the coil and radially overspread the magnet. This design contributes to the compact arrangement of the present invention necessary for an in-line skate wheel. The number of arms of each component of the armature can be varied during manufacture to match or not match the number of poles on the magnet. Because the armature is easily affixed to the hub of the wheel, it may be changed at will at produce varied electrical outputs.

The term "axle" has been used in the description of prior art, and in the prior application. However, the term "stationary drum" is preferably used in place of the term "axle" for purposes of describing the present invention. The stationary drum of the current invention is a separate and distinct component from the axles of previous inventions. It contributes to the interchangeability of the components. Recognizing Price, Park and Kumakura, the magnets thereof have been affixed to the axles in their designs. The ring magnet of the present invention is fit to a stationary drum rather than to an axle. When assembled with other components of the in-line skate wheel, now a unit, the magnet maintains a spacial relationship to the armature and coil which is not disturbed should the user wish to change axles. The stationary drum may be easily removed from the original equipment manufacturer's axle.

Another purpose of this invention is to illuminate by refraction or reflection a transparent or translucent in-line skate wheel tire, with a single continuous or intermittent illumination device, preferably a phosphoroelectroluminescent light strip.

The present invention will also produce varied and interesting light and sound patterns which may be obtained with the use of a direct current generator. From a single light source in the tire, multiple stationary light patterns are visible to the observer. The kind and quantity of stationary patterns produced from one light source are directly proportional to the number of poles on the ring magnet of the generator. For instance, an eight pole magnet will produce four stationary points of light from a single light source contained within the transparent or translucent tire of the present invention.

Because all of the wheels of an in-line skate may each contain a generator, ample power will be available to illuminate company names, trademarks, logos, sponsorships or other decoration on the boot or power light sources contained within the tires. To further intensify the light display, the present invention contains provision for a reflective strip between the tire and rim of the wheel. The reflective strip may also be positioned behind the company logo or decoration on the boot for the same purpose. Transferring power from the wheels to the boot is also beneficial because it allows the boot to be designed without bulky battery power packs.

In another configuration, light emitted by the wheels of the present invention may be made to illuminate the whole tire. This is desirable because in-line skate wheel supports partially obstruct visible light emitted from the side of the wheel. If a constant glow illuminates the whole tire, there is a better change it will be seen around these obstructions. The emitted light is also visible directly ahead and behind the skater. This would not be true if light were only emitted from the side of the skate wheel.

BRIEF DESCRIPTION OF THE DRAWING

FIG. 2 is an exploded sectional view of the components comprising the wheel assembly. The wheel contains three component parts, the stationary drum, the two piece hub and the tire/rim assembly, all of which are interchangeable with similar parts which may be of different configurations to permit the skater to simply mix or match the components. Also shown is an electrical coupling mechanism which will permit transfer of electrical energy from the skate wheel to the boot should the skater prefer to use as means of power generation in the skate wheel hub.

FIG. 3 is an exploded sectional view of the in-line skate wheel demonstrating the three basic components which permit interchangeability. Shown are the stationary drum, the two-piece hub and the tire/rim assembly.

FIG. 4 shows the three components of the in-line skate wheel in assembled format.

FIG. 5 is an exploded cross section view of the three component wheel with optional direct current generating means.

FIG. 6 is an assembly of the three component wheel with optional direct current generator installed.

FIG. 7 is an elevational view of the three-piece wheel showing assembly screws rather than snap fit connections. Either method may be used to assemble the components.

DETAILED DESCRIPTION OF PREFERRED EMBODIMENTS

Figure 1:
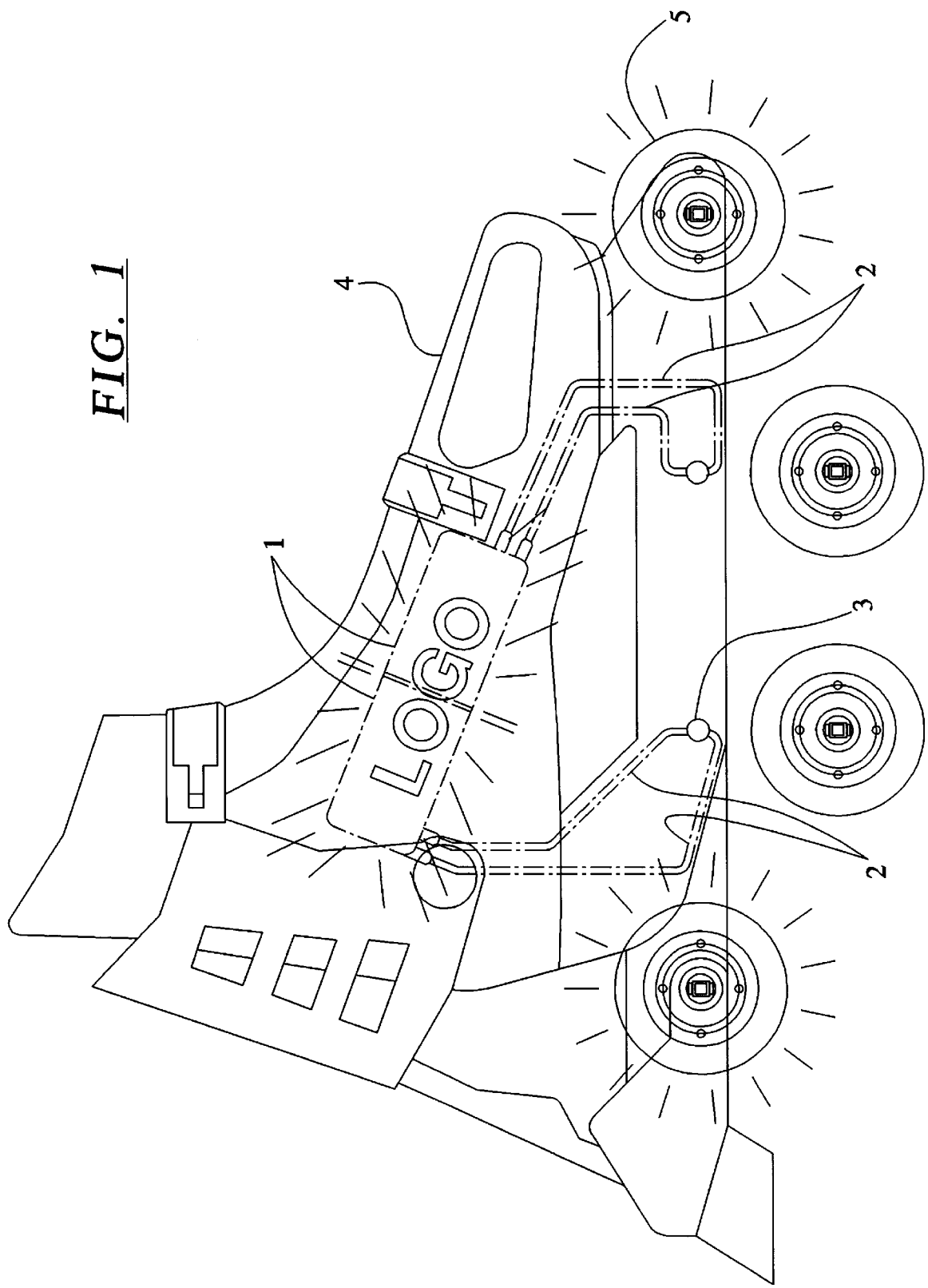
FIG. 1 is a side elevational view of the in-line skate showing the component wheels and incorporating a means of transferring electrical energy generated by the wheels to illuminated decoration on the boot.

Referring first to FIG. 1, there is shown an in-line skate provided with interchangeable component substitute wheels 5 and a boot 4 with illuminated company logo and/or illuminated decorations 1 and means of electrical connection to the skate wheels 2,3, all designed in accord with the present invention. The light sources behind the decorations 1 are recessed within the boot 4 and are covered by an insignia or decoration that permits light transmission to form company names, logos, sponsorships, etc. The wheels are designed in such a manner as to be attached to the in-line skates with the mounting bolts supplied by the original equipment manufacturer. The wheels are identical and therefore a detailed description of one will suffice for all.

Referring specifically to the FIG. 2, there is shown an exploded view of the three component in-line skate wheel with electrical connection to the boot frame. The stationary drum 9, the two-piece hub 11,12, and the translucent or transparent tire/rim assembly 16,17 are combined by means of the screws 10,13 to form the in-line skate wheel of the present invention. Specifically, the two-piece hub 11–12 is rotationally mounted upon stationary drum 9 by means of ring bearings 7,7. The screws 10,13 may also take the form of molded-in snap fittings which would permit quick change of component parts. The tire/rim assembly 16,17 may be easily removed from the two-piece hub 11,12 and the stationary drum 9 to allow interchangeability of the wheel components and/or inexpensive replacement of the tire/rim assembly 16,17. Since in-line skate wheel sets are expensive and tires must be replaced as they wear out, the present invention will allow a less expensive replacement of the tires without need of replacing the entire wheel. Different colored tires may also be used. Slip fit electrical connections 14,15 are also shown. At least two connections 14 in the hub 12 and two connections 15 in the rim 16 are provided to permit transfer of electrical energy. Power is transferred through the in-line skate frame 19 from the wheel by means of electrical contacts 8 in the stationary drum 9 to the non-rotatable coupler 6 which is mounted in the skate frame 19. From the non-rotatable coupler 6, electrical energy is transferred to the conductors 2 which lead to the illumination and/or sound producing devices in the boot. All of the coupling elements are snap fit to permit easy replacement or change over of the wheel components.

Now referring specifically to FIG. 3 showing the three basic components in exploded section, a single light source 20 is embedded within a transparent or translucent tire 17. A reflection strip 21 is also shown at the juncture of the tire 17 and the rim 16. The single light source 20, appears to emit a continuous light as opposed to flashing or stroboscopic light. The emitted light that illuminates the transparent or translucent tire 17, is radiated throughout the tire and becomes visible to the observer. The single light source 20 appears stationary in the tire 17 when viewed by an observer. The single light source 20 of the present invention produces several stationary visible light source points within the tire in direct proportion to the number of poles on the magnet of a generator should a generator be used to power the light. For instance, if an eight pole ring magnet is used, four stationary points of light will be observed in the tire 17. The present invention may also embody one phosphorelectroluminescent strip light 20 embedded within the tire that will emit colored light along the entire inner diameter of the tire. A reflective strip 21 of the rim 16 of the tire/rim assembly and to the outer diameter of the two-piece hub 12 are provided to allow transfer of electric power from a source which may be located in the two-piece hub 11,12. Radial thrust bearings 115 are lightly press-fit to the stationary drum 11,12 and permit rotation of the two piece hub 11,12 on the stationary drum 9. The axle provided by the original equipment manufacturer is not shown and is not part of the current invention.

In FIG. 4 there is shown assembled the three component in-line skate wheel. The components include a tire/rim assembly 16,17 with a single light source 20 and electrical conducting means 14,15, a two-piece hub 11,12, a means of connection 23 from the output of the power source to the slip fit electrical connections 14,15, and a stationary drum 9 which permit a certain amount of flexibility to the owner. One substantial advantage is that the tire/rim assembly 16,17 may be easily replaced at cheaper cost than the entire wheel if the tire wears out. The present invention allows the owner to replace any of the components of the three component wheel at less expense than replacing the entire wheel. Additionally, the owner of the wheel may wish to add a power generation means to the hub.

In FIG. 5 in combination with the hub 12, the armature of a direct current generator 24 is shown installed within the hub 12 as an interchangeable unit of the current invention. The hub is so designed that the generation means may be easily installed without the use of tools. Shown also are at least two slip fit electrical connections 14 attached to the outer diameter of the two-piece hub. When the two-piece hub 11,12 and the tire/rim assembly 16,17 are fit together, the slip fit connections 14 will go in with the slip fit connections 15 of the rim 16. The magnet 36 is press fit to the stationary hub 9.

In FIG. 6, a direct current generator 24, as opposed to an alternating current generator, is shown installed. The direct current generator 24 contains electrical devices which permit production of direct electrical current; the uses thereof have been previously discussed. The present invention will also emit light when the wheel FIG. 6 is rotated either backward or forward.

FIG. 7 illustrates the arrangement of the set screws 10,13 which permit interchangeable wheel components. The set screws 10,13 of the current invention may also be a molded in snap fastening arrangement to permit quick change over of component parts.

Figure 8:
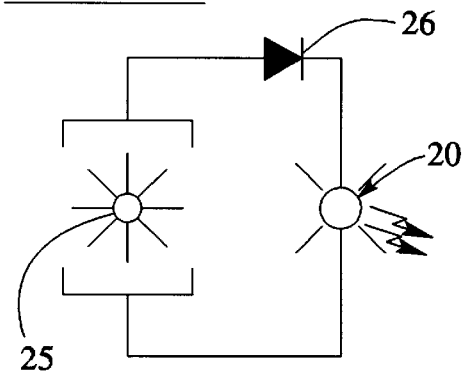
FIG. 8 is an electrical schematic diagram illustrating the manner in which direct current is generated using an in-line diode.

In FIG. 8 a means of producing direct electrical current is diagrammatically shown. An in-line diode 26 is shown connected between the armature 25 of the generator an the single light source 20. The in-line diode permits an intermittent flow of electrical energy in one direction to the single light source 20. The single light source 20 will be intermittently energized.

Figure 9:
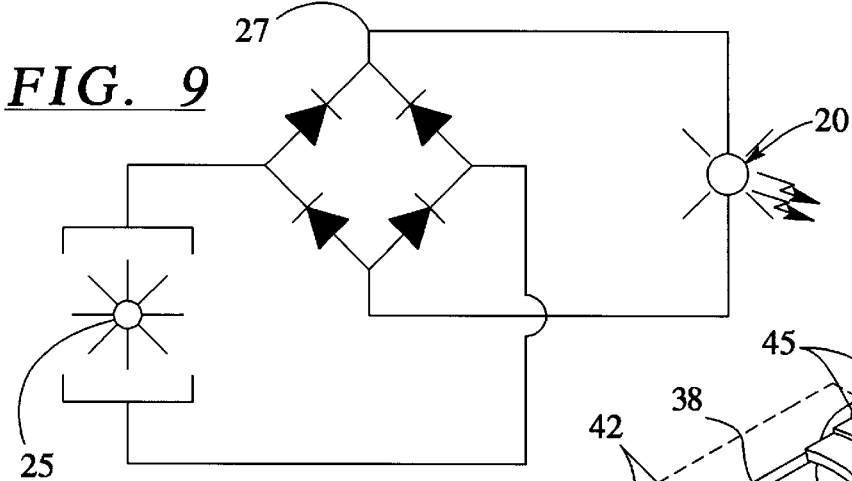
FIG. 9 is an electrical schematic diagram illustrating the manner in which direct current is generated using a bridge rectifier.

In FIG. 9 another means of producing direct electrical current is diagrammatically shown. An bridge rectifier 27 is shown connected between the armature 25 of the generator and the single light source 20. The bridge rectifier permits a continuous flow of electrical energy in one direction to the single light source 20. The single light source 20 will be continually energized.

Figure 10:
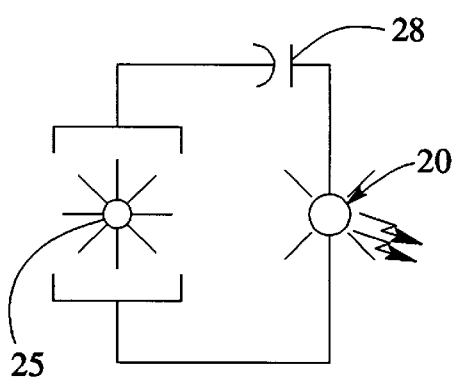
FIG. 10 is an electrical schematic diagram illustrating the manner in which direct current is generated using a capacitor.

In FIG. 10 another means of producing direct electrical current is diagrammatically shown. A capacitor 28 is shown connected between the armature 25 of the generator and the single light source 20. The capacitor stores electrical energy and permits a relatively large intermittent flow of electrical energy in one direction to the single light source 20. The single light source 20 will be intermittently energized at a greater intensity when the capacitor is discharged.

Figure 11:
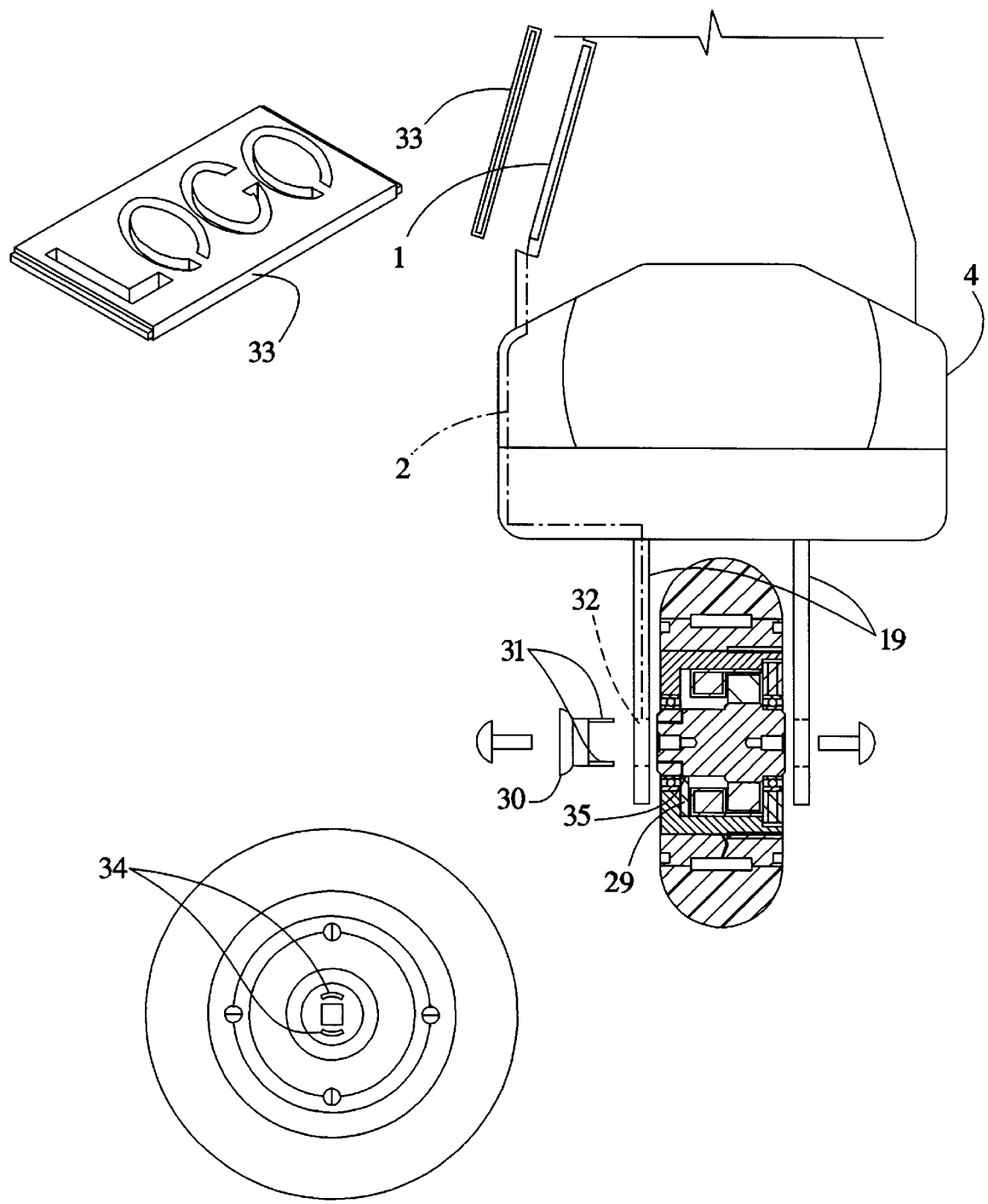
FIG. 11 is a cross section of the electrical connection between the three-piece wheel assembly, the electrical coupler and the boot. This sectional view also illustrates the illuminated decoration or logo facia.

FIG. 11 transferring electrical energy from within the wheels via slip fit electrical connections 34 to external parts of an in-line skate boot is accomplished by a rotational contact assembly 29 and a non-rotating coupler 30 containing two electrical conducting terminals 31. The non-rotating coupler 30, transfers electrical energy from the wheel to the boot 4 via electrical conductors 2 in the wheel support framework 19. The boot has at least two electrical terminals 32, each with a slip fit connection to the non-rotating coupler 30. The boot 4 may be fitted with recessed pockets containing the illumination means 1 and an insignia facia 33, or an illuminated surface mounted insignia or decoration, etc. may be used.

Figure 12:
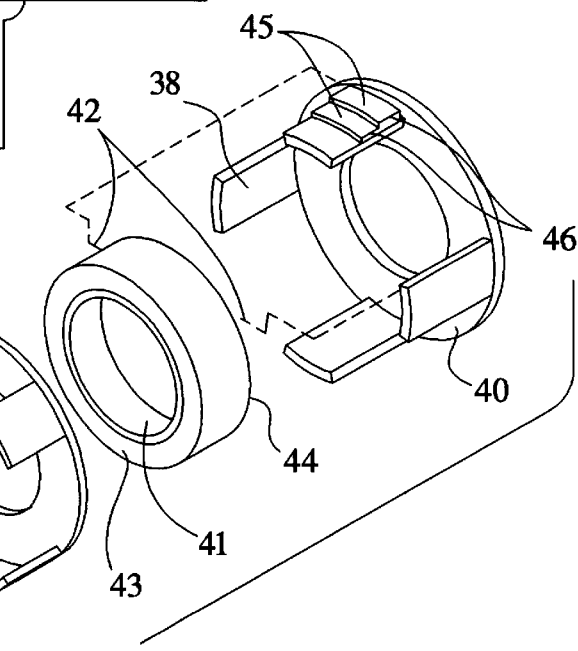
FIG. 12 is an exploded view of the armature, coil, stationary drum and magnet which shows the unique arrangement of the armature arms with slip fit electrical connections.

FIG. 12 depicts the unique arrangement of the armature arms 37,38 which contribute to the compactness of the interchangeable component design of the current invention. During the manufacturing process, ring 41 is affixed to one side of the armature 39. Rigid insulation materials 43,44 are press fit to either end of the ring 41. The coil 42 can be easily wound upon this assembly. Also shown in the stationary drum 9 with slip fit electrical contacts 8 and magnet 36. All of the components are fit together within the component hub. The number of armature arms 37,38 may be varied to produce interesting and unique electrical outputs for powering illumination or audible devices contained within the tire or the boot. Because hubs with different numbers of armature arms 37,38 will be made available and because hubs are interchangeable with other components of the in-line skate wheel, the skater may use any combination to produce the effects desired.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of any inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A modular skate wheel having interchangeable components and comprising:

a removable modular stationary drum including mounting means thereon for a ring magnet;

at least one ring magnet having a plurality of poles mounted upon said stationary drum;

a removable modular hub rotationally mounted upon said stationary drum for containing said ring magnet and power generating means therewithin and having an exterior radial surface thereof;

ring bearing means mounted between said removable hub and said stationary drum for rotational movement of said removable hub;

a modular tire assembly including a tire rim, a light source which is electrically connected to said power generating means, and a light transmitting tire mounted upon said tire rim radially of said light source, said tire rim having an outer radial surface with a recess formed therein which cooperates with a recess formed in an inner radial surface of the light transmitting tire to form a chamber for receiving said light source, said modular tire assembly together with said included light source removably carried by said removable modular hub adjacent said exterior radial surface thereof; and said light source transmitting light in substantial amounts both radially and axially through said light transmitting tire.

2. The modular skate wheel of claim 1 wherein said modular tire assembly comprises a tire rim for removable mounting upon the exterior radial surface of said modular hub and a tire mounted on said tire rim.

3. The modular skate wheel of claim 1 wherein said removable hub has a removable face.

4. A. The modular skate wheel of claim 1 wherein said removable hub contains direct current power generating means therewithin.

5. The modular skate wheel of claim 1 wherein said tire is attached to said removable modular hub by snap fit attachment means.

6. The modular skate wheel of claim 1 wherein said light transmitting tire further contains a reflective strip.

7. The modular skate wheel of claim 1 wherein said light source generates light proportional to the number of poles of said ring magnet.

8. The modular skate wheel of claim 1 wherein said light source comprises an electrical coil which is disposed radially adjacent said ring magnet for compactness of design.

9. The modular skate wheel of claim 1 wherein said removable modular hub includes at least two electrical conducting terminals.

10. The modular skate wheel of claim 2 wherein said tire rim comprises electrically conductive material and said removable modular stationary drum comprises electrically conductive material and wherein said tire rim is mounted upon said removable drum for electrical contact therebetween.

11. The modular skate wheel of claim 1 wherein said removable modular stationary drum includes slip fit means for mounting upon a skate axle carried by said skate.

12. The modular skate wheel of claim 1 wherein said at least one ring magnet comprises removable modular stationary drum includes at least two commutators.

13. The modular skate wheel of claim 1 wherein said at least one ring magnet is secured to a stationary drum.

14. The modular skate wheel of claim 1 wherein said ring magnet comprises a rare earth, aluminum, neodymium, nickel, cobalt, alnico or flexible magnet.

15. The modular skate wheel of claim 1 wherein said two or more ring magnets, stacked and secured to the stationary drum.

16. The modular skate wheel of claim 1 wherein said light source comprises electrically conducting coil mounted windings wound between inner and outer armature assemblies, with each coil wire end connected to conducting terminals.

17. The modular skate wheel of claim 1 wherein said light generating and emitting means comprises a current generator which includes armature arms protruding laterally from the coil and radially overspreading said ring magnet.

18. The modular skate wheel of claim 1 further comprising a power transfer coupler with at least two electrical terminals, said power transfer coupler being electrically connected to said stationary drum for transferring power from the wheel to a skate boot.

19. The modular skate wheel of claim 18 wherein said electrical connection is by slip fit means.

20. The modular skate wheel of claim 18 wherein said power transfer coupler is carried by a skate boot.

21. The modular skate wheel of claim 1 wherein said light source includes a compact generator with an in-line diode contained within the removable modular hub to produce an intermittent direct electric current.

22. The modular skate wheel of claim 1 wherein said light source includes a compact generator with a bridge rectifier contained within the two-piece hub to produce continuous direct electric current.

23. The modular skate wheel of claim 1 wherein said light source includes a compact generator with a capacitor contained within the modular hub to produce intermittent bursts of direct electrical current.

24. The modular skate wheel of claim 1 wherein said light source includes a direct current generator contained within said modular skate wheel to produce power whether the wheel is rotated forward or backward.

25. The modular skate wheel of claim 1 wherein said light source includes a compact generator with a two-part armature design containing a spindle and containing arms extending laterally from an induction coil and radially over the ring magnet.

26. The modular skate wheel of claim 1 wherein said light source includes a compact generator and an armature arrangement having a plurality of armature arm in which the number of armature arms may be varied to produce unique and distinct electrical output patterns from the generator.

* * * * *